United States Patent [19]

Achille

[11] 4,440,374
[45] Apr. 3, 1984

[54] INTEGRALLY FORMED RESILIENT CLIP AND EXTENSION

[75] Inventor: Jean R. Achille, Forest Park, Ill.

[73] Assignee: Illinois Tool Works Inc., Chicago, Ill.

[21] Appl. No.: 256,220

[22] Filed: Apr. 21, 1981

[51] Int. Cl.³ .......................................... F16M 13/00
[52] U.S. Cl. ................................. 248/544; 248/74 A
[58] Field of Search ..................... 248/544, 63, 65, 70, 248/73, 74 A, 74 R; 24/255 R

[56] References Cited

U.S. PATENT DOCUMENTS

| | | | |
|---|---|---|---|
| 2,650,948 | 9/1953 | Findlay | 174/168 |
| 2,746,112 | 5/1956 | Simon | 248/74.3 X |
| 2,928,637 | 3/1960 | Jansson | 248/68 |
| 2,948,940 | 8/1960 | Degener | 248/74.3 X |
| 3,309,052 | 3/1967 | Borisof | 24/255 R X |
| 3,491,971 | 1/1970 | Fisher | 248/65 |
| 3,599,915 | 8/1971 | Soltysik | 248/74.3 X |
| 4,083,523 | 4/1978 | Fisher | 248/74.3 |
| 4,325,526 | 4/1982 | Kitagawa | 248/73 |
| 4,352,476 | 10/1982 | Meeks | 248/74 R |

FOREIGN PATENT DOCUMENTS

| | | | |
|---|---|---|---|
| 121380 | 11/1900 | Fed. Rep. of Germany | 24/255 R |
| 654329 | 4/1929 | France | 24/255 R |

*Primary Examiner*—William H. Schultz
*Assistant Examiner*—Ramon O. Ramirez

*Attorney, Agent, or Firm*—Thomas W. Buckman; John P. O'Brien; Jack R. Halvorsen

[57] ABSTRACT

The present invention relates generally to a resilient clip for supporting elongated articles such as cylindrical and ribbon-like electrical conductors, and the like. The invention disclosed includes a base member which may be secured to a support by an adhesive and/or a retaining fastener. The base has an integrally formed flexible arm extending upwardly therefrom which superimposes the exposed side of the base. The free end of the arm has a hinged connection and a pressure plate integrally formed therewith, with the hinged connection interposed between the end of the arm and the pressure plate. The pressure plate position when the clip is relaxed, normally is adjacent to and substantially parallel to the base. The hinged connection at the free end of the arm is formed by a reduction in the thickness of the material adjacent to where the arm attaches to the pressure plate. The end of the arm and the pressure plate are deflectable outwardly away from the base and the pressure plate is pivotable relative to the end of the arm to permit an article or articles to be inserted between the plate and the base. The pressure plate, when clamping plural or flat ribbon-like articles, will self-adjust to exert an equalized pressure to each article at the point, or points where the article engages the plate.

17 Claims, 13 Drawing Figures

U.S. Patent   Apr. 3, 1984   Sheet 1 of 2   4,440,374
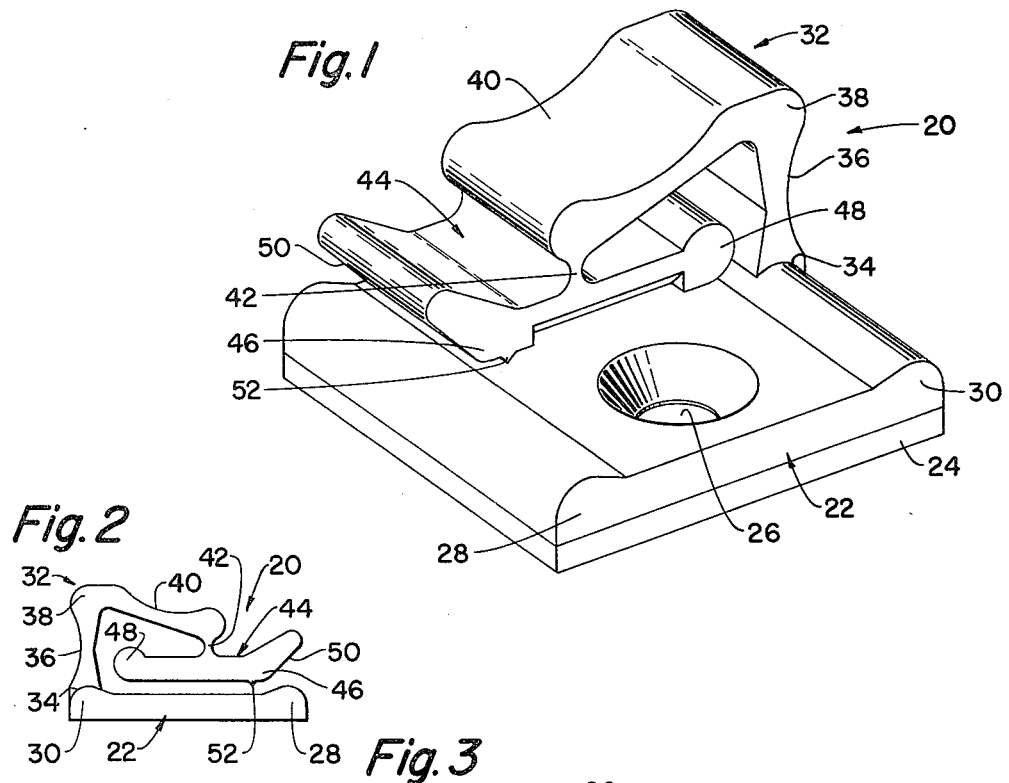
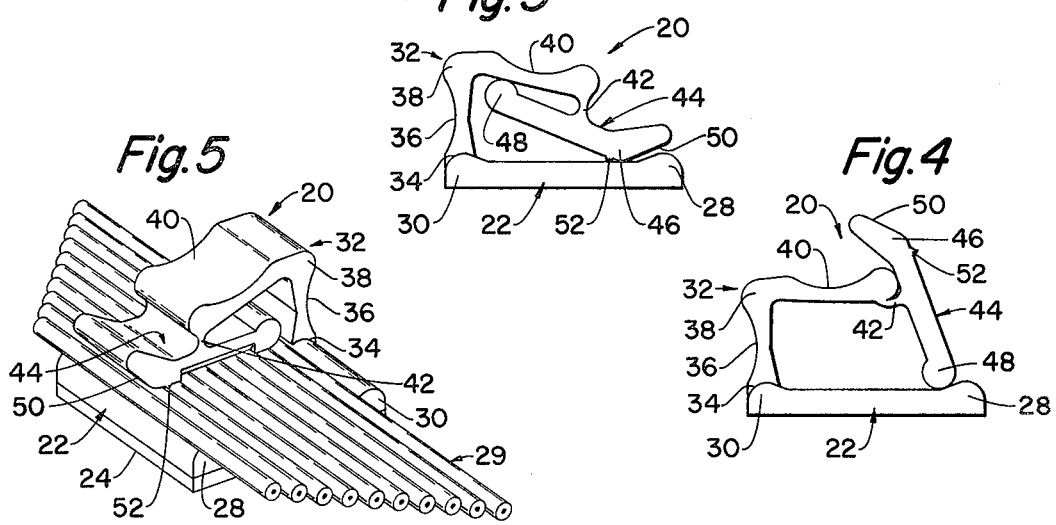
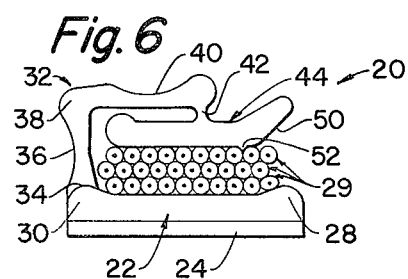
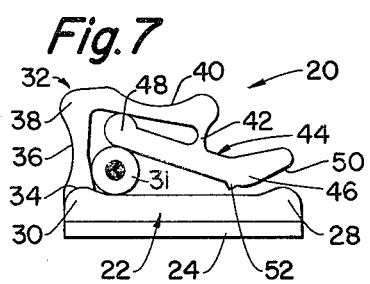

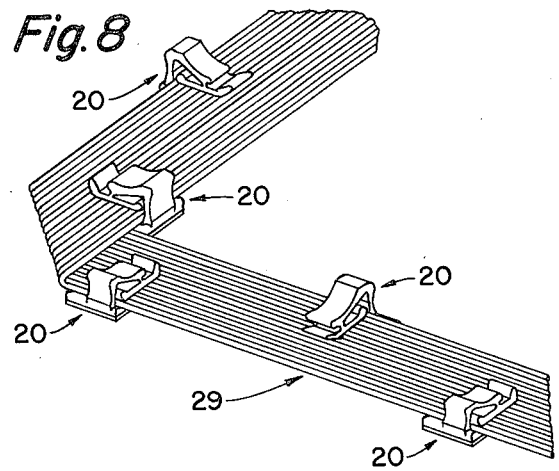
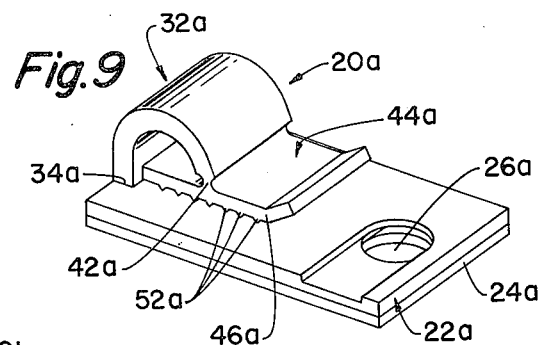
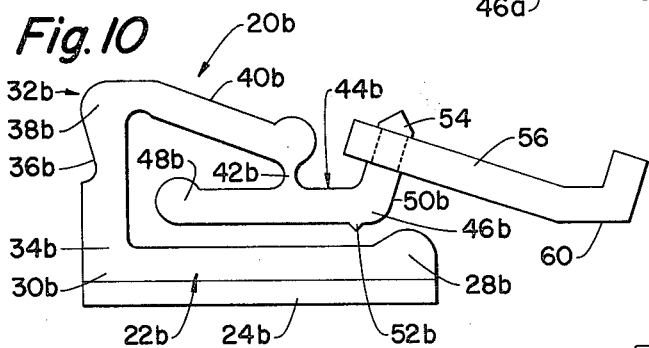
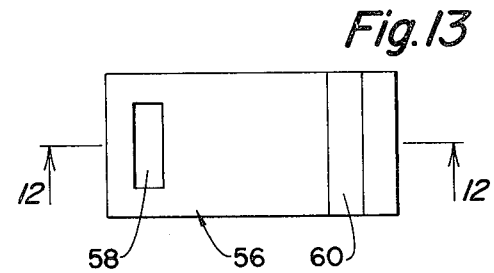
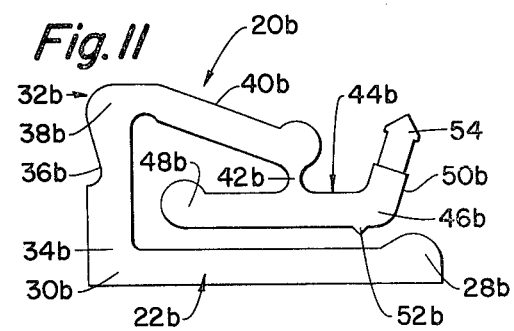
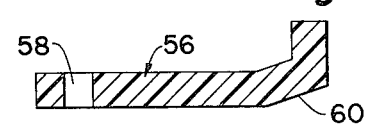

INTEGRALLY FORMED RESILIENT CLIP AND EXTENSION

BACKGROUND OF THE INVENTION

The device of the present invention relates to a means for releasably attaching electrical cables and the like to supporting surfaces such as walls, baseboard moldings and cabinets. More particularly the device relates to a clip which is self adherable and/or fastened by a retaining fastener to a variety of surfaces with the option, as necessity dictates, of not having to drill holes or otherwise damage the surface to which the clip is attached. The clip is designed to releasably retain singular, plural, and ganged electrical wires or cabled. When ganged and plural wires are retained the clip will do so without concentrating the pressure exerted by the clip on just one of the wires of the plurality or the ganged group.

One prior art device, U.S. Pat. No. 3,491,971 to Fisher, used for attaching telephone cords to walls and the like, is a plastic clip which is adhesively bonded to a support surface. The clip has a base and a resilient arm which cooperates to retain the cord in position. Another prior art device, U.S. Pat. No. 2,650,948 to Findlay, shows a pressure plate which equalizes the pressure applied to a plurality of wires being retained in position by the holder.

SUMMARY OF THE INVENTION

The device of the present invention permits easy and convenient attachment of elongate articles, such as electrical cables and the like, to walls, cabinets, and other supporting surfaces. The clip may be attached to a support by utilizing the pre-applied adhesive backing; by using a retaining fastener through a preformed aperture, or by using both the adhesive and a retaining fastener. The clip will securely mount cables and the like and release the same by a simple manual manipulation of the resiliently biased portion of the clip. The clip is designed to apply pressure to each of a plurality of elongated articles that are being supported by the clip to ensure that each article will be retained.

The clip is particularly useful in retaining very wide ribbon-like cables which are substantially wider than the widest portion of the clip. In this situation a plurality of the clips may be used, such that by positioning clips in an alternating manner on opposite edges of the flat cable the cable will be positively retained against lateral movement relative to its longitudinal direction.

The clip can be economically fabricated in one piece from dielectric plastic materials and readily positioned for use with a minimum amount of labor to provide low cost in ultimate installed usage.

BRIEF DESCRIPTION OF THE DRAWINGS

The foregoing features and advantages of the improved clip will become more fully evident when considered along with the following description of the preferred forms thereof by reference to the accompanying drawings, wherein:

FIG. 1 is a perspective view of one embodiment of the clip;

FIG. 2 is a side view of the clip of FIG. 1 showing the clip in an unbiased condition;

FIG. 3 is a side view of the clip of FIG. 1 showing the pivotal extent of the pressure plate in a clockwise direction;

FIG. 4 is a side view of the clip of FIG. 1 showing the pivotal extent of the pressure plate in a counter-clockwise direction;

FIG. 5 is a perspective view of the clip of FIG. 1 showing a segment of a ribbon-like cable in partial section being supported thereby;

FIG. 6 is a side view in partial section of the clip of FIG. 1 showing a stack of ribbon-like cables being maintained by the clip;

FIG. 7 is a side view of the clip of FIG. 1 supporting a single cable;

FIG. 8 illustrates one practical application of a plurality of the clips of the instant invention for retaining a wide ribbon-like cable;

FIG. 9 is perspective view of another embodiment of the clip;

FIG. 10 is a side view of yet another embodiment of the clip, which includes the additional feature of a removable extension element;

FIG. 11 is a side view of the main clip portion of FIG. 10 with the extension element;

FIG. 12 is a side view in section of the extension element seen in FIG. 10; and

FIG. 13 is a top view of the extension element shown in FIG. 12.

DETAILED DESCRIPTION

Referring now to the drawings in more detail, wherein like numerals have been employed to designate similar parts throughout the various views.

The preferred embodiment of the present invention is illustrated as a clip designated generally by the numeral 20 in FIGS. 1-8 inclusive. The clip 20 is preferably formed from electrically insulative material such as a suitable plastic which will have sufficient resiliency to impart the required retaining action. The clip includes a base portion generally designated as 22 having on one side thereof a layer of pressure sensitive adhesive material 24 for securing the plate to the surface of a support member. Alternatively, the base may be attached to the surface of a support by a retaining fastener, such as screw or snap fastener, not shown, cooperating with an aperture 26 formed in the base 22. At the option of the installer of the clip, either the adhesive or the fastener or both may be used to ensure positive securement of the clip to the surface.

The base 22 includes two opposite marginal edges 28, 30 of increased thickness. Extending upwardly from a junction 34 with the base along one of the marginal edges of the base is an arm 32. The arm superimposes the side of the base which is exposed when the clip has been mounted. The arm includes an upstanding portion 36, an elbow 38, and an overhanging arm portion 40. At the free end of the arm 32 there is an area of reduced thickness 42 hingedly attaching a pressure plate 44 thereto. The pressure plate 44 is attached by the hinge along a line substantially equidistant from opposite marginal edges 46, 48. The pressure plate 44 is substantially co-extensive with the base 22 and is generally parallel to the base when at rest. The outer marginal edge 46 of the pressure plate 44 has an outwardly and upwardly inclined flange 50 to act as a cam and as a manually engageable release. On the side of the pressure plate 44 facing the base 22, near the outer marginal edge 46, is a projecting rib 52 which projects towards the base and extends substantially the width of the pressure plate 44.

In operation, the clip 20 is attached to a support structure such as a cabinet or wall and then an elongated article is inserted in the clip and retained thereby. It is contemplated that standard electrical wire 31 of various sizes, ribbon-like wire 29 which is simply a plurality of coated wires attached along their outer peripheries, as well as tubes and pipes can be secured by the clip 20. The article to be supported by the clip 20 is guided into the clip 20 initially by the cam surface 50. Then the pressure plate 44 pivots and the resilient arm 32 flexes to permit the article to be positioned between the pressure plate 44 and base 22. In the situation where the article is a single cable 31 or a tube it is preferrably positioned between the marginal edges 46, 48 of the base 22 towards the connection of the upstanding arm and base 34 as in FIG. 7. The pressure plate 44 in this instance will pivot until its inner edge 48 engages the overhanging arm 40 or the outer edge 46 engages the base 22, depending upon the diameter of the article. When the inner edge 48 engages the overhanging arm 40 the pressure transmitted to the cable 31 is substantially greater than when the base 22 is engaged.

Of particular benefit is the capability of the clip 20 to retain ribbon-like cables and plural, single articles. When a ribbon-like cable is inserted in the clip 20 the pressure plate 44 pivots to engage and apply pressure equally to each of the wires that comprise the ribbon. This avoids damaging any of the wires due to excessive pressure being applied, over a period of time, to just one of the wires. The rib 52 on the pressure plate 44 will engage the ribbon cable between any pair of juxtaposed wires of the cable and aid in the retention of the cable in the clip by resisting lateral sliding movement perpendicular relative to the axis of the cable. The rib 52 has a secondary benefit in that it will create a greater pressure at the inner edge 48 of the pressure plate 44 if the ribbon cable moves laterally. This is due to the rib 52 riding up over a component wire of the ribbon cable causing the pressure plate 44 to pivot the inner edge 48 downward, thus squeezing the cable more tightly against the base 22.

The enlarged edges 28, 30 of the base 22 normally position an article therebetween but when a ribbon cable 29 of a width greater than the base is supported, the enlarged edge 30 along the outer marginal edge acts to create a pressure ridge in the cable and coacts with the rib 52 on the pressure plate 44 to maintain a positive grip. Where the flat cable is of excessive width a plurality of staggered clips can be used along opposite edges of the cable as shown in FIG. 8. When a plurality of single articles, e.g. wires or tubes, are inserted in the clip 20 the pressure plate 44 will pivot to apply an equalized pressure to each of the articles along the line where the article is engaging the plate 44.

FIG. 4 shows a position in which an article may be supported by the clip 20 without any pressure being applied thereto. This is important if a soft flexible tube is to be positioned and the tube must not be squeezed, e.g. in the routing of tubes from I.V. bottles. In this position the pressure plate 44 is pivoted outwardly until the inner edge 48 is past the point where it would be perpendicular to the base 22. The pressure plate 44 is held in this over center position by the resiliency of the arm 32.

FIG. 9 discloses a slightly modified form of the clip. The structural elements of this embodiment which function similar to like elements previously described are identified by corresponding numerals bearing the subscript "a". In this embodiment the overhanging arm 32a follows a continuous radius and the surface of the pressure plate 44a, that faces the base 22a, has a plurality of ribs 52a thereon. The stress of flexing in the overhanging arm 32a is transmitted continuously therealong to its point 34a of attachment to the base. In this embodiment the area of attachment 34a of the arm 32a to the base 22a needs to be of sufficient strength to avoid fatigue and failure. The plural ribs 52a may be evenly or randomly spaced and where a particular gauge of ribbon-like cable is used the spacing may be predetermined to permit each rib 52a to engage the cable between adjacent pairs of wires.

FIGS. 10–13 disclose a further embodiment wherein similar numerals are used to designate similar parts with the addition of the suffix "b", and wherein the clip 20b is adapted to have an extension 56 attached to the outer edge 46b of the pressure plate 44b. In this embodiment the outwardly and upwardly inclined flange 50b includes a projection 54 which has an enlarged end. Cooperating with the pressure plate 44b to extend the effective reach of the clip 20b is an extension 56. The extension 56 has an aperture 58 near one end and an upwardly inclined flange 60 at the other end. The aperture 58 is sized to coact with the projection 54 to secure the extension 56 to the pressure plate 44b. The inclined flange 60 at the outer end of the extension 56 is meant to function in essentially the same manner as flange 50 in FIG. 1. With the extension 56 secured to the pressure plate 44b it will be seen that there is an area above the marginal edge of increased thickness 28 which will coact with the edge 28 and the pressure ridge created in the ribbon cable 29 to positively retain the same.

From the foregoing it will be apparent that the present invention contemplates a one-piece, spring-type, injection molded plastic dielectric clip, and in one embodiment includes a one-piece removable extension, of extremely simple yet practical form. The design of the above described clip and extension renders them easily manufactured by conventional methods of molding plastic. The incorporation of applicants' novel structural arrangement of the pressure plate and hinge increases the versatility of the clip. An article and/or articles retained by the clip will be positively positioned and retained by the pressure plate cooperating with the base. The ease of installation of the device on a support and ease of insertion of articles into the clip are clear benefits of the device. The novel arrangement of applicant's device materially facilitates the ease with which a workman can attach articles, such as electrical conductors and tubes, to a support.

For purposes of illustration, clips of various design have been disclosed herein. It should be understood that other forms of the clip are contemplated by the present invention and that numerous modifications may be made by those of skill in the art without departing from the scope and spirit of the invention.

I claim:

1. A resilient clip adapted for releasably accommodating at least one elongated article, such as tube or cable, wherein said clip includes a base, an integral resilient arm means attached to one side of the base adjacent one edge and having an end disposed in spaced overlying relation to said base, pressure means for positioning said at least one article relative to said base including a side facing said base and opposite outer margins extending generally transverse to the length of said resilient arm means, flexible integrally formed means attaching the pressure means to the end of the said resilient arm means, said flexible means disposed transverse to the length of said resilient arm means and intermediate said outer margins, said pressure means normally positioned adjacent the base and laterally yieldable away from said base along with the end of said resilient arm means to permit insertion, between the base and the pressure means, of an article to be supported, said pressure means including rib means on said side facing said base.

2. The resilient clip as set forth in claim 1 wherein the base includes means to attach it to a support.

3. The resilient clip as set forth in claim 2 wherein the means to attach includes an adhesive.

4. The resilient clip as set forth in claim 2 wherein the means to attach is an aperture through the base adapted to receive a retaining fastener that engages the support means.

5. The resilient clip according to claim 1 wherein said rib means associated with the face of the pressure means includes a plurality of ribs extending generally transverse to the length of said resilient arm means.

6. The resilient clip as set forth in claim 1 wherein the pressure means includes a cam portion at its outermost opposite outer margin to facilitate entry of articles to be supported by the clip and manual disengagement of the pressure means to facilitate removal of the articles from the clip.

7. The resilient clip as set forth in claim 1 wherein the clip is integrally formed of a molded plastic material.

8. The resilient clip as set forth in claim 7 wherein the integrally formed clip is of an electrically insulative material.

9. The resilient clip as set forth in claim 1 wherein the pressure means is substantially coextensive with the base.

10. The resilient clip as set forth in claim 1 wherein the base has a region of reduced thickness bounded by areas of increased thickness along the marginal edges of the base extending generally parallel to said integral means.

11. A resilient clip adapted for releasably accommodating at least one elongated article, such as tube or cable, wherein said clip includes a base, an integral resilient arm means attached to one side of the base adjacent one edge and having an end disposed in spaced overlying relation to said base, pressure means for positioning said at least one article relative to said base including a side facing said base and opposite outer margins extending generally transverse to the length of said resilient arm means, flexible integrally formed means attaching the pressure means to the end of the said resilient arm means, said flexible means disposed transverse to the length of said resilient arm means and intermediate said outer margins, said pressure means normally positioned adjacent the base and laterally yieldable away from said base along with the end of said resilient arm means to permit insertion, between the base and the pressure means, of an article to be supported, said flexible means includes a section of a thickness which is less than the thickness of the resilient arm means, whereby the pressure means attached to the resilient arm means by the flexible means may pivot relative thereto.

12. The resilient clip as set forth in claim 11 wherein when the clip is to support more than one elongated article or a ribbon-like elongated article, the pressure means may engage and pivot to apply a substantially equalized pressure where each article or portion of the article engages the pressure means.

13. The resilient clip as set forth in claim 11 wherein the section of reduced thickness attaches the pressure means to the arm means substantially equidistant from the opposite outer margins.

14. A resilient clip adapted for releasably accommodating at least one elongated article, such as tube or cable wherein said clip includes a base, an integral resilient arm means attached to one side of the base adjacent one edge and having an end disposed in spaced overlying relation to said base, pressure means for positioning said at least one article relative to said base including a side facing said base and opposite outer margins extending generally transverse to the length of said resilient arm means, flexible integrally formed means attaching the pressure means to the end of said resilient arm means, said flexible means disposed transverse to the length of said resilient arm means and intermediate said outer margins, said pressure means normally positioned adjacent the base and laterally yieldable away from said base along with the end of said resilient arm means to permit insertion, between the base and the pressure means, of an article to be supported, extension means for increasing the size of the pressure means, said pressure means and said extension means including cooperating means to releasably secure the extension means to the pressure means.

15. The resilient clip of claim 14 wherein the extension means is integrally molded plastic including an upturned cam means at its outer free end to facilitate manual release of an article from the clip.

16. A resilient clip adapted for releasably accommodating at least one elongated article, such as tube or cable wherein, said clip includes a base, an integral resilient arm means attached to one side of the base adjacent one edge and having an end disposed in spaced overlying relation to said base, pressure means for positioning said at least one article relative to said base including a side facing said base and opposite outer margins extending generally transverse to the length of said resilient arm means, flexible integrally formed means attaching the pressure means to the end of the said resilient arm means, said flexible means disposed transverse to the length of said resilient arm means and intermediate said outer margins, said pressure means normally positioned adjacent the base and laterally yieldable away from said base along with the end of said resilient arm means to permit insertion, between the base and the pressure means, of an article to be supported, said pressure means includes an enlargement which co-acts with the resilient arm means to provide increased resilient engagement of the clip with a single large sized elongated article.

17. A one-piece resilient clip for releasably securing elongated articles, such as wires and tubes and the like, to a support, comprising: a base, arm means projecting to one side of said base, pressure plate means, and flexible hinge means, said arm means including an overhanging resilient portion having an end disposed in overlying relation to said base, said pressure plate means disposed between said end and said base and attached to said end by said flexible hinge means, said end spaced a first predetermined distance from said base when said clip is unbiased, said pressure plate means including an inner marginal edge spaced from said hinge means a second predetermined distance, said second distance being greater than said first distance, said flexible hinge means being sufficiently flexible to permit said pressure plate means to rotate more than 90 degrees from an unbiased position to an over-center biased position, whereby said clip may support elongated articles by clamping said articles between said pressure plate means and said base or by confining said article in a non-clamping relationship in an area bounded by said base, said arm means and said pressure plate means when said pressure plate means is in said over-center biased position.

* * * * *